United States Patent
Anamoto

[11] Patent Number: 5,934,242
[45] Date of Patent: Aug. 10, 1999

[54] ENGINE LUBRICANT SUPPLY CONTROL

[75] Inventor: Takayuki Anamoto, Iwata, Japan

[73] Assignee: Yamaha Hatsudoki Kabushiki Kaisha, Iwata, Japan

[21] Appl. No.: 08/924,901

[22] Filed: Sep. 8, 1997

[30] Foreign Application Priority Data

Sep. 6, 1996 [JP] Japan .................................. 8-236539

[51] Int. Cl.⁶ .................................................. F01M 1/00
[52] U.S. Cl. ................................. 123/196 R; 123/73 AD
[58] Field of Search ...................... 123/196 R, 198 C, 123/73 AD

[56] References Cited

U.S. PATENT DOCUMENTS 4,445,470  5/1984  Chmielewski .
4,774,918  10/1988  Kurio .................................. 123/196 R
5,390,635  2/1995  Kidera et al. ....................... 123/196 R
5,597,051  1/1997  Moriya et al. ...................... 123/196 R
5,662,081  9/1997  Paul et al. .
5,701,872  12/1997  Kaku et al. ........................ 123/196 W

FOREIGN PATENT DOCUMENTS 0508486  10/1992  European Pat. Off. .
2606073  5/1988  France .
9526462  10/1995  WIPO .

Primary Examiner—John Kwon
Attorney, Agent, or Firm—Knobbe, Martens, Olson & Bear LLP

[57] ABSTRACT

A number of embodiments of lubricant pump and control systems for internal combustion engines, such as two-cycle engines, wherein the condition of the pump is compared with a control signal to the pump and if the conditions are not the same, a warning and protective action is initiated.

12 Claims, 10 Drawing Sheets

ENGINE LUBRICANT SUPPLY CONTROL

BACKGROUND OF THE INVENTION

This invention relates to an internal combustion engine and more particularly to an improved lubricant supply control for such engines.

As is well known, engines require lubricant for their effective operation. With four cycle internal combustion engines, the lubricant is normally supplied to the engine through a recirculating lubricating system wherein the oil is not spent during the operation of the engine. With two cycle engines, on the other hand, the oil is delivered to the engine and is consumed through its lubricating or burned during combustion and any surplus is discharged through the exhaust along with that which has burned. Thus, it is very important to ensure that the amount of lubricant supplied to a two-cycle engine is very accurately controlled so as to minimize the amount of unused oil that will be discharged to the atmosphere through the exhaust.

For that reason, it has been proposed to dispense with or eliminate the previous type of lubricating systems utilized commonly with two-cycle engines wherein the lubricant was mixed with the fuel. In addition to not being as responsive to actual incremental engine running conditions, this mixing of lubricant with the fuel does not always assure that each component of the engine receives proper amounts of lubricant.

There have been proposed, therefore, a number of lubricating systems wherein lubricant is delivered directly to the components of the engine through a delivery system that can be controlled on a cycle-to-cycle basis. These systems generally use reciprocating type pumps that are operated through one or more cycles during one or more revolutions of the engine. By controlling the number of cycles in which the pump is operative, it is possible to control the actual amount of lubricant supplied.

Frequently, these pumps are operated by electric solenoids and as such types of pumps permit a wide variety of duty cycles and duty times in order to provide the varying degrees of oil required. However, if the pump becomes inoperative or the components stick, then dangerous conditions can occur for the engine.

It is, therefore, a principal object of this invention to provide an improved system for controlling the oil supply to an engine and determining when an abnormal condition occurs.

It is a further object of this invention to provide an improved lubricant protection system for an internal combustion engine.

Because of the very small amounts of lubricant that are pumped with this type of arrangement and which are consumed by the engine, it is very difficult to actually measure or sense the output of the pump to determine if it is operating properly.

It is, therefore, a still further object of this invention to provide an improved detecting device for detecting an inoperable condition in a lubricant pump for an engine and initiating protective action or warning action upon this detection.

SUMMARY OF THE INVENTION

This invention is adapted to be embodied in a lubricating system for an internal combustion engine that includes a solenoid operated reciprocating pump. A control system controls the timing of reciprocation of the pump so as to control the amount of lubricant delivered to at least one of the engine components. The solenoid operates to provide an on/off cycle which will determine the actual pumping stroke of the pump and a subsequent delay before the next pumping cycle. Means are provided for detecting an abnormal operating condition by comparing the cycles of the pump with the control cycles transmitted to the driving solenoid by the control system.

DETAILED DESCRIPTION OF THE PREFERRED EMBODIMENTS OF THE INVENTION

Figure 1:
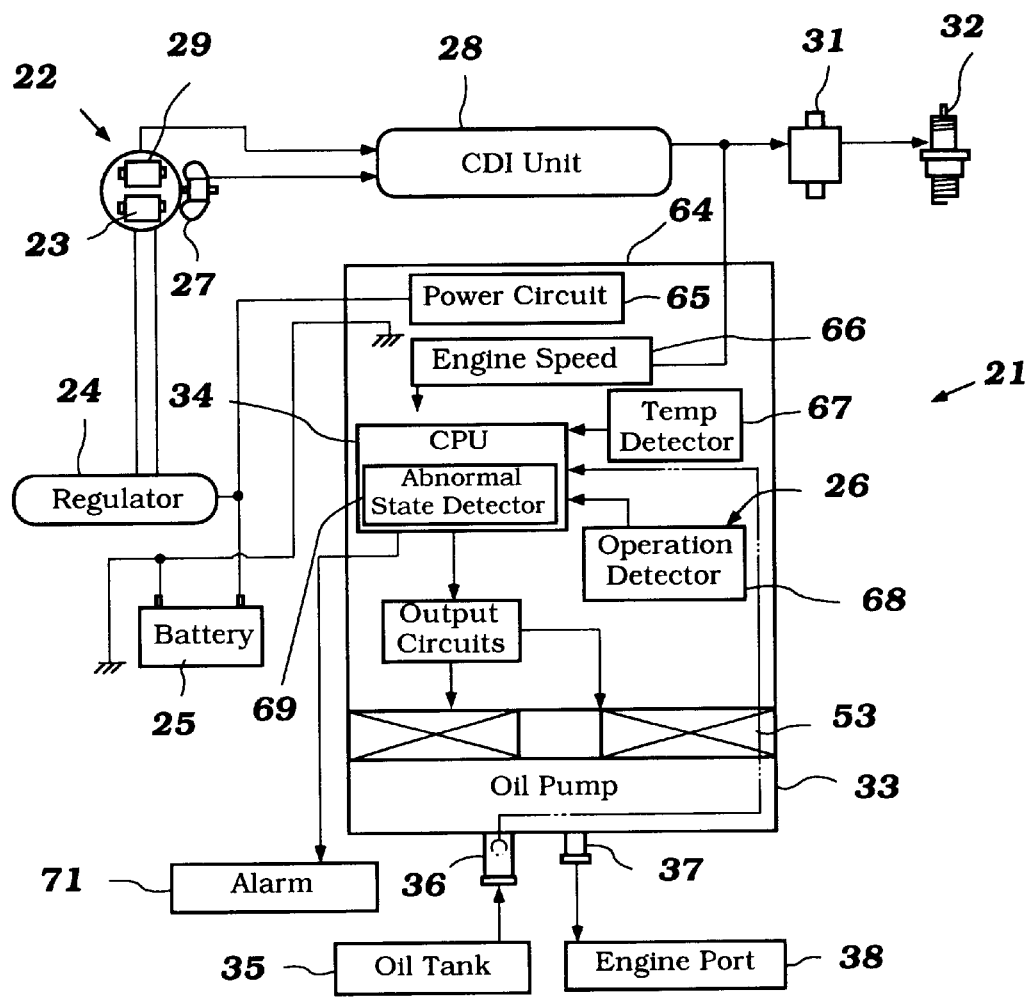
FIG. 1 is a partially schematic view of an internal combustion engine having a lubricating system constructed in accordance with an embodiment of the invention and showing some of the control components and associated systems.

Referring now in detail to the drawings and initially primarily to FIG. 1, certain components of an internal combustion engine, which is identified generally by the reference numeral 21, are illustrated. In this figure, the actual construction of the basic engine 21 is not illustrated because it will be readily apparent to those skilled in the art how the invention can be utilized with a wide variety of engine types and configurations. However, the invention has particular utility in conjunction with two cycle engines wherein the engine is lubricated by delivering finite amounts of lubricant to certain components of the engine.

For example and as is well-known in the art, oil or other lubricant may be delivered in incremental amounts to the skirt of the piston through, for example, a lubricating orifice in the cylinder bore, and to the various journal surfaces associated with the crankshaft, connecting rod, and the connection of the connecting rod to the piston through the piston pin. Since these specific delivery systems are not a significant part of the invention and since the invention deals primarily with the monitoring of the output of the lubricating pump, the engine details are not illustrated.

Basically, the engine has an output shaft that is coupled to a load and which drives a magneto generator assembly, shown schematically by the reference numeral 22. This magneto generator system 22 includes a charging coil 23 which is associated with one or more magnets driven by the flywheel for generating electrical power output. This output is delivered to a regulator 24 for charging a battery 25.

In addition, the battery output is employed to a control and pump unit, indicated generally by the reference numeral 26 and which will be described in more detail later.

A pulser coil 27 is associated with the magneto generator 22 and outputs a trigger circuit to a CDI ignition unit, shown schematically and identified by the reference numeral 28. This CDI unit includes a capacitor (not shown) charged by a further charging coil 29 which, when discharged will induce a voltage in a coil 31. This voltage is stepped up and is utilized to fire a spark plug 32.

As should be readily apparent, the spark plug 32 is associated with the combustion chamber of the engine for igniting a charge in the combustion chamber. This type of arrangement is well known in the art and, for that reason, a detailed description of it is not believed to be necessary to permit those skilled in the art to practice the invention for the reasons which have been aforenoted.

Continuing to refer to FIG. 1, the control and pump unit 26 includes as a sub-component an oil pump which is shown schematically and as identified by the reference numeral 33. This oil pump may be of the type shown in FIGS. 2 or 3 and will be described in more detail later by reference to them.

This oil pump 33 is operated by a CPU 34 in accordance with a control strategy which will also be described later. Basically, the oil pump 33 functions so as to draw oil from an oil reservoir or tank 35 through an inlet check valve 36. During each stroke of the oil pump 33, a finite amount of lubricant is delivered through a discharge port 37 to the engine components, one of which is illustrated schematically and identified by the reference numeral 38. It is to be understood that there may be one or more discharge conduits that supply various components of the engine. As has been noted, these types of systems are well known in the art and the invention may be utilized with most known systems.

The oil pump 33 will now be described in more detail by reference to FIG. 2 with the major portion of the description, except as will be noted, also applying to FIG. 3. This oil pump 33 includes an outer housing that consists of an outer shell 39 that has a first end closure 41 contained therein and which defines the discharge conduit 37 and an inlet conduit 41 having a passageway 42. A pump body 43 is mounted within this end closure 41 and defines a pumping bore 44 in which a pumping plunger 45 is reciprocally supported.

This pumping bore 44 communicates with the conduit 42 through a supply passage 46 in which a filter element 47 is positioned. The delivery check valve 36 is provided internally of this unit. It is to be understood, however, that there may be a series of delivery check valves.

Figure 2:
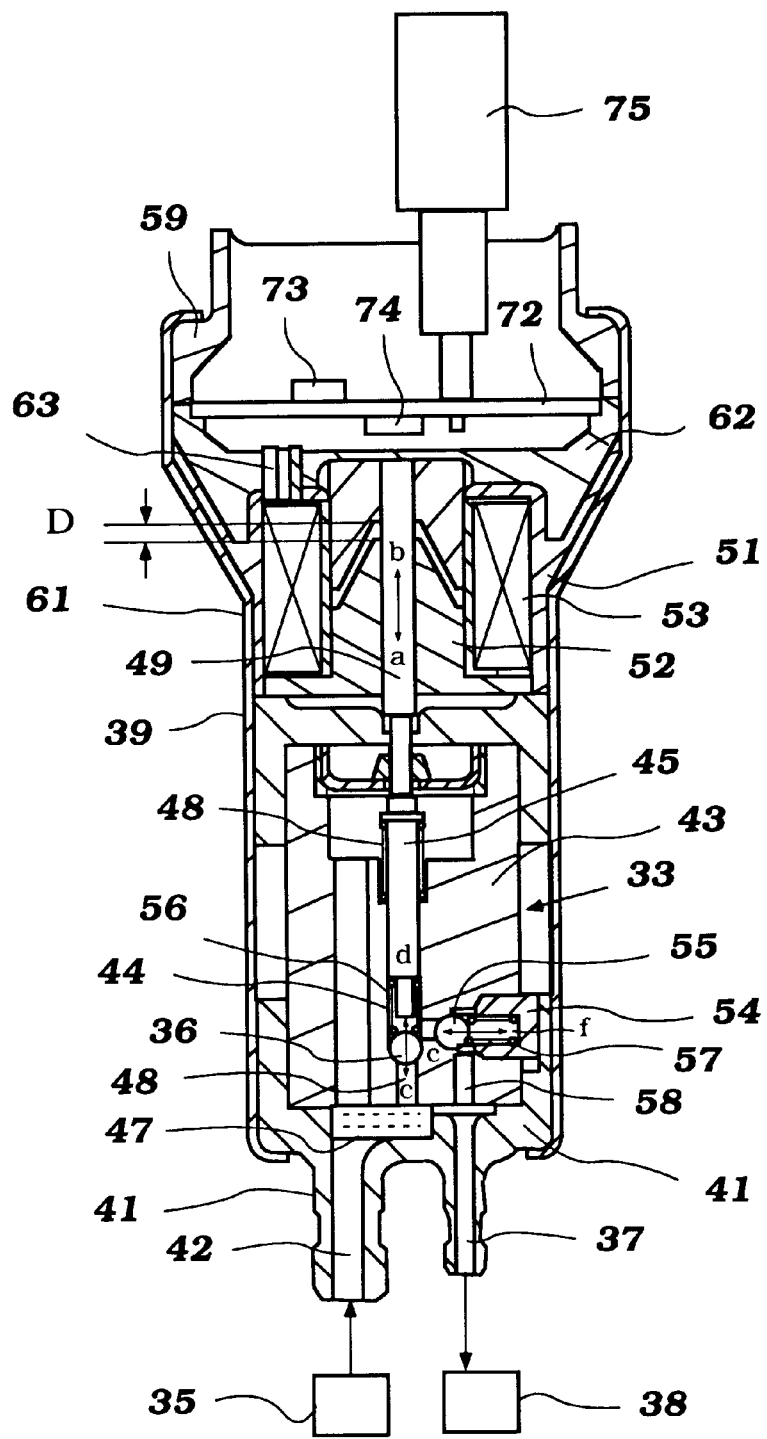
FIG. 2 is an enlarged cross-sectional view showing the lubricant pump and a first type of sensor associated therewith for sensing an abnormal condition.
Figure 3:
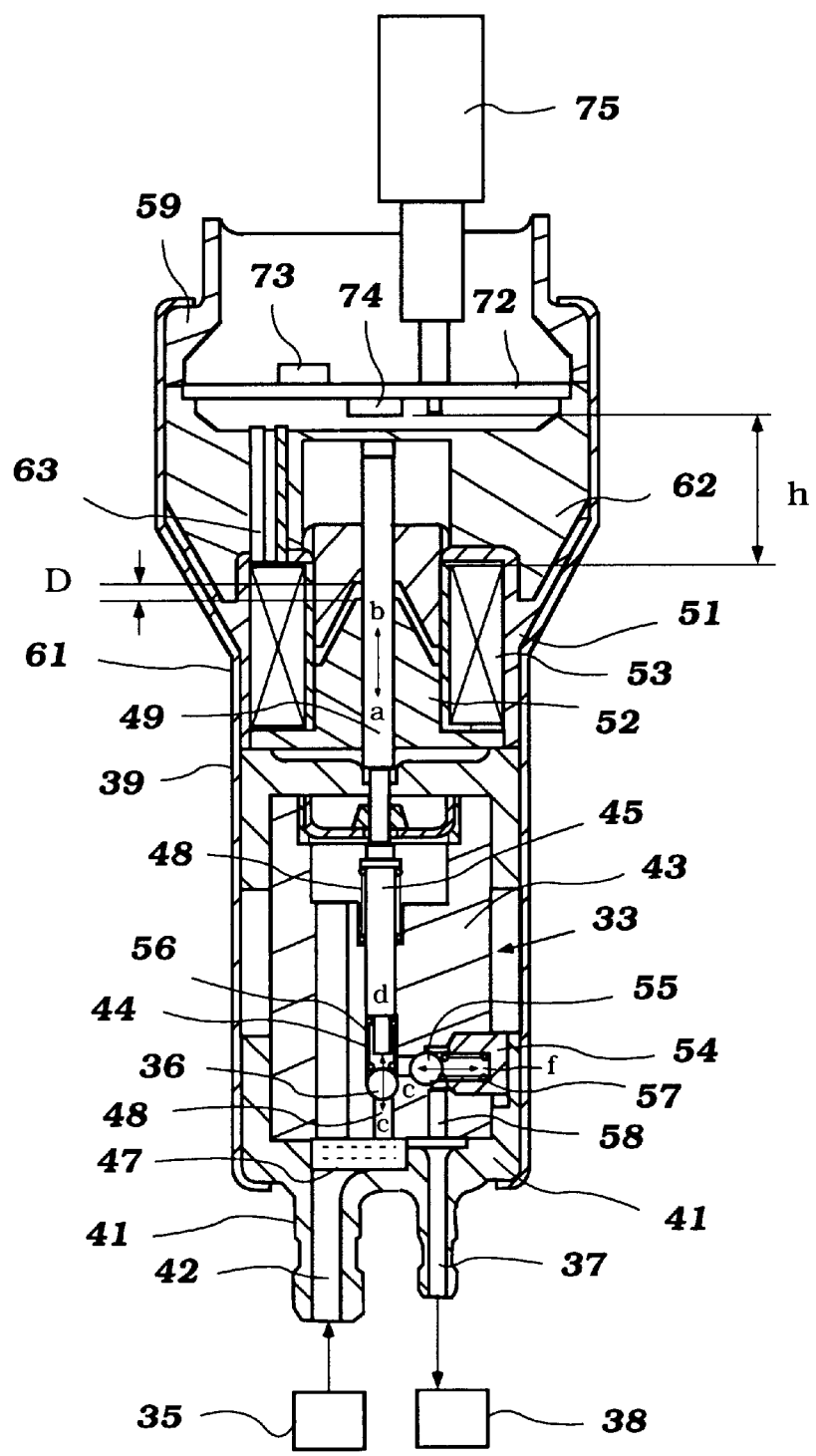
FIG. 3 is a cross-sectional view, in part similar to FIG. 2, and shows another embodiment of the invention.

The plunger 45 is normally urged to a retracted position as shown in FIGS. 2 and 3 by a coil compression spring 48. When this occurs, the effective volume of the pumping bore 44 increases and fluid will be drawn through the conduit 42, filter 47 and passage 48 to open the delivery valve 36 and permit filling of the chamber.

The upper end of the pumping plunger 45 is associated with an armature 49 of a solenoid assembly, indicated generally by the reference numeral 51. This solenoid assembly 51 includes a core 52 in which the armature 49 reciprocates. A solenoid winding or coil 53 encircles the core 52 and when energized will effect reciprocation of the armature 49 and, accordingly, reciprocation of the pumping plunger 45.

Basically, when the winding 53 is energized, the armature 49 will move downwardly and force the pumping plunger 45 in the same direction to compress the spring 48. Fluid is then expelled through a discharge fitting that is comprised of a check valve assembly 54 having a ball-type check valve 55 that controls the flow from the pumping bore 44 through a discharge passage 46. When the check valve 55 opens, against the action of a spring 57, communication with a passage 58 in the pump body 43 permits flow to the discharge conduit 37.

To continue to describe the pump construction, the upper end of the housing 39 is closed by a closure member 59 which holds a solenoid retainer member 61 in position. This retainer member 61 is held by an intermediate spacer 62 and the terminals for the winding 53, indicated at 63, pass through this spacer 62.

Referring again to FIG. 1, the drive circuit for the winding or coil 53 is shown schematically at 63. This receives the output of the CPU 34 and effects energization or deenergization of the winding 53 so as to effect the pump operation.

The pump 33 is operated through a pumping cycle in a given time period which is determined in a manner to be described so as to ensure that adequate amounts of lubricant are supplied to the engine components 38.

In order to accomplish this, the control unit, indicated generally by the reference numeral 64, includes a power circuit 65 that receives electrical power from either the battery 25 or regulated power from the magneto generator charging coil 23. This is utilized to control the pump 33 by switching of the electrical power to the solenoid winding 53 through the drive circuit 63.

Certain engine data is supplied to the ECU 34 for this control. This includes an engine speed signal that is provided by a sensor unit 66 in the control 64. This sensor 66 receives pulses from the CDI unit 28 that are transmitted to the coil 31 and hence provide an indication of number of firings of the spark plug 32 in a given time period. This provides an engine speed signal, as should be readily apparent.

In addition, a temperature detector 67 may be incorporated so as to sense the oil temperature and control the amount of lubricant based upon this.

In accordance with an important feature of the invention, there is also provided a pump condition or abnormal condition detector indicated generally by the reference numeral 68 and which operates in a manner which will be described. In the event of an abnormal condition this operational detector 68 outputs a signal to an abnormal state detector circuit 69 of the CPU which operates in accordance with a strategy which will be described. In the event an abnormal pump condition is sensed, then an output signal is sent to an alarm, indicated generally by the reference numeral 71 and which may initiate protective action, as will also become apparent.

The control strategy by which the oil pump 33 is driven will now be described initially by reference to FIGS. 4–6.

Before referring in detail to these figures, the general strategy will be described.

Basically, the CPU 34 receives inputs from various sensors to determine the instantaneous lubricant requirements for the engine 21. Basically, these involve at least a reading of engine speed by the speed sensor 66. In addition, other conditions are read such as oil temperature by the detector 67. Load may also be read by such factors as throttle valve setting and various other parameters may be utilized. Since the specific way in which the amount of lubricant supplied forms no major part of the invention, it will not be described in any significant detail.

However, once the CPU 34 determines the amount of lubricant which is being consumed by the engine based upon its instantaneous running conditions, a lubricant discharge cycle is begun. This is done by actuating the solenoid winding 53 so as to draw the armature 49 downwardly and drive the pumping plunger 45 through a pumping cycle. The solenoid winding is then deenergized and the pumping plunger 45 returns to its home position drawing into the chamber 44 another charge of oil.

Based upon the read parameters of the engine consumption, the system then waits until the engine has made a number of revolutions necessary to consume the delivered oil. The cycle is then repeated.

Figure 4:
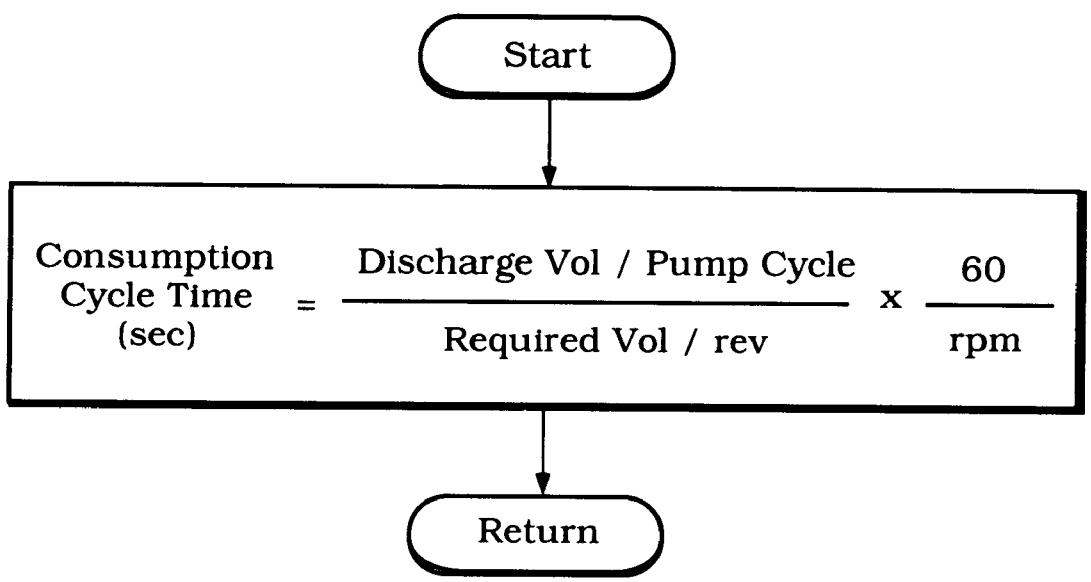
FIG. 4 is a diagram showing the control routine for effecting a pump cycle in order to control the amount of lubricant applied to the engine.

Thus, and by reference to FIG. 4, the system operates to set an initial consumption cycle time. This is done by dividing the amount of discharge of the oil pump 33 in one cycle by the required volume of lubricant required by the engine or lubricated component per rotation. This is then multiplied by 60 divided by the engine speed.

Figure 5:
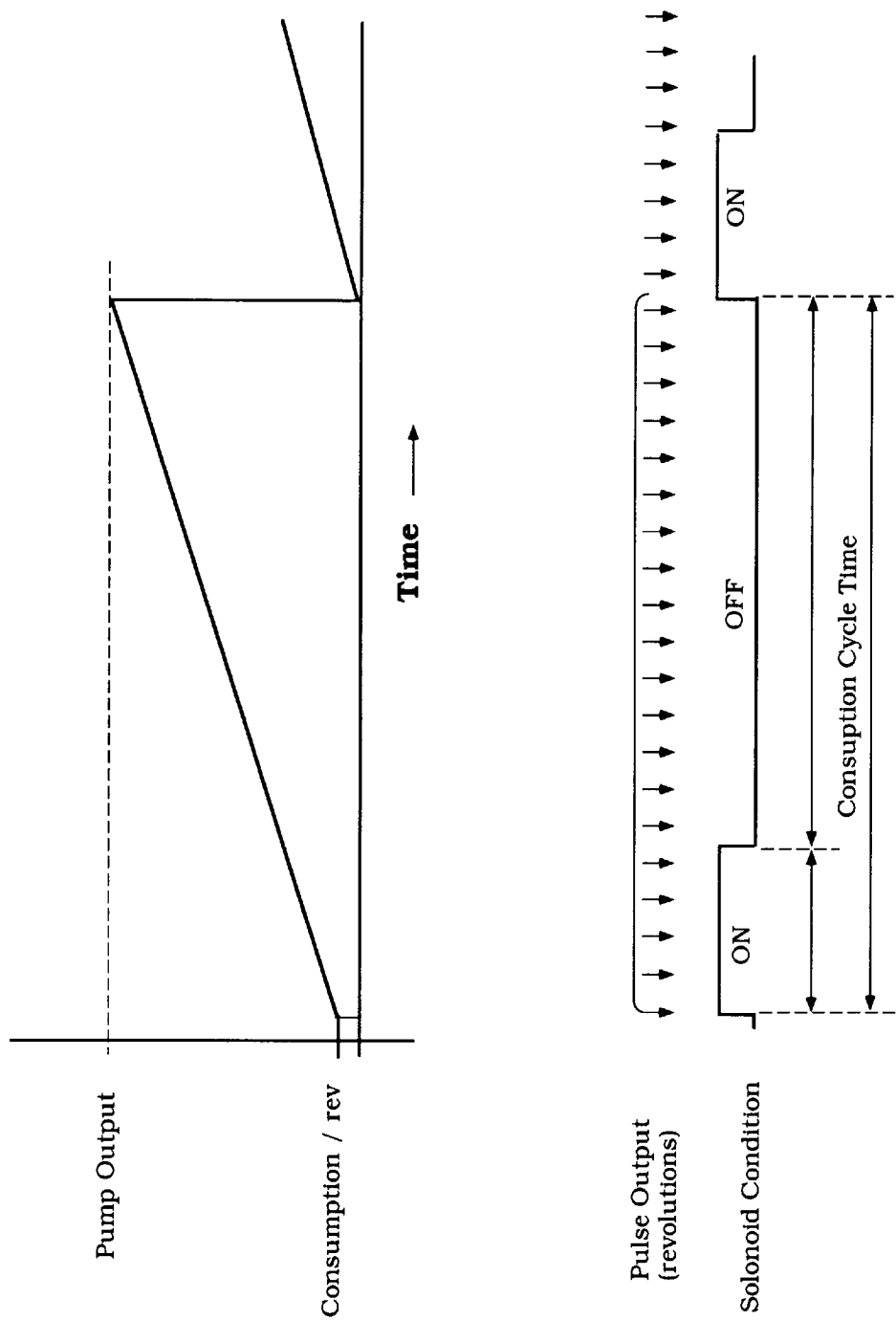
FIG. 5 is a graphical view showing, at the top portion, the way in which the pump operates to provide a certain amount of lubricant during a cycle of engine operation with the pump output with respect to time being shown at the top, the engine rotational pulses, and electromagnetic solenoid condition being shown at the bottom.
Figure 6:
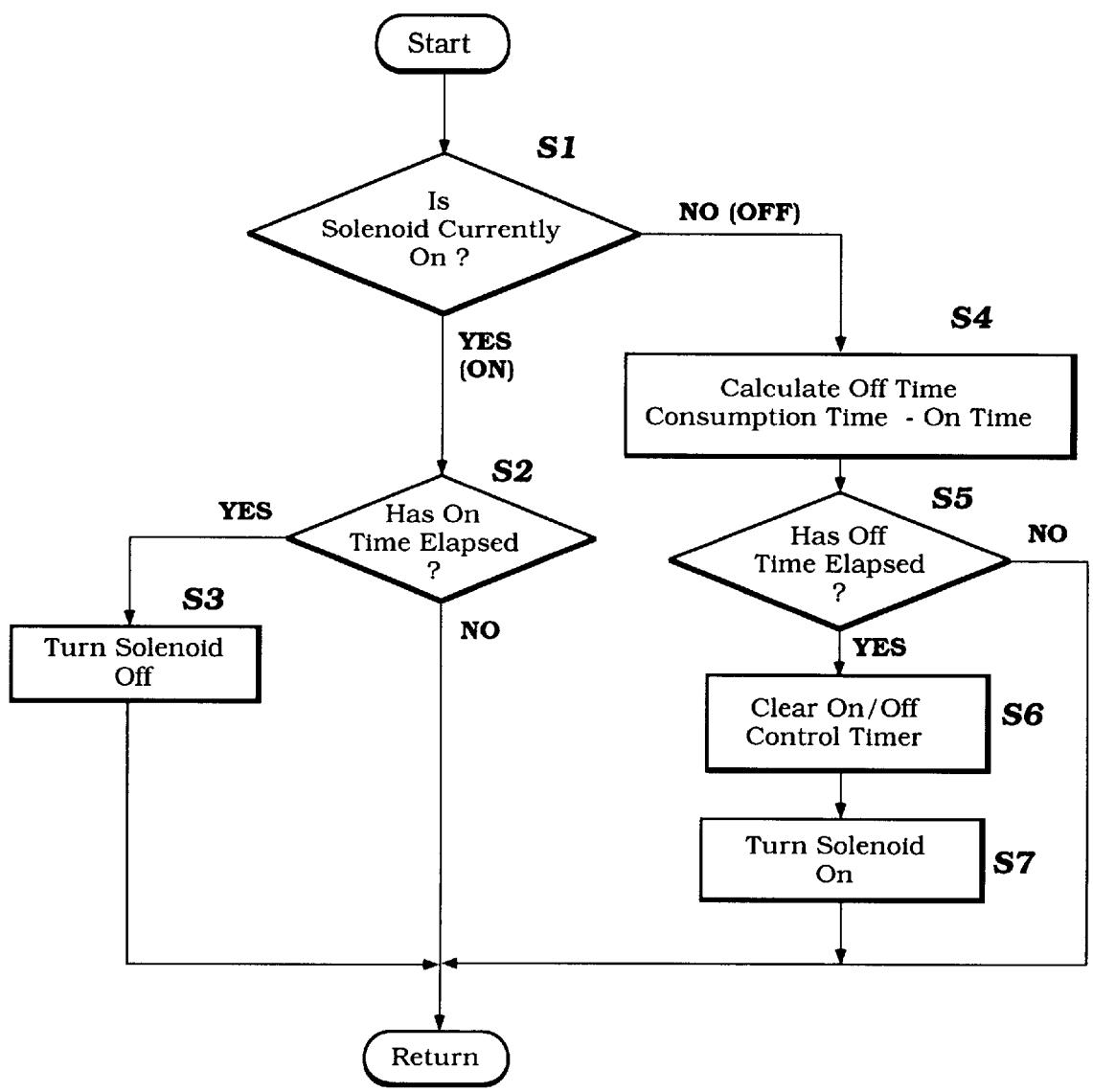
FIG. 6 is a graphical view showing the control routine for determining the pump cycle time in accordance with the invention under which the amount of lubricant supplied to the engine is controlled.

The effect of this may be seen in FIG. 5. The upper curve shows the actual consumption of oil assuming that the engine is running at a constant speed over a given time period. The broken line shows the actual pump output. Thus, at the beginning of the cycle, the solenoid is turned on and the pump will discharge the amount of oil shown at the broken line. The engine speed is counted by the counter 66 by counting the number of firings this being equal to the number of engine revolutions since the engine is a two-cycle engine and the spark plug 32 is fired once each revolution. The pump is not cycled again by energizing the solenoid 53 until the consumption cycle time calculated in accordance with FIG. 4 has elapsed and then the cycle repeats.

The control strategy by which the CPU 34 achieves this will now be described by reference to FIG. 6. The program starts and moves to the step S1 to determine whether the solenoid winding 53 is energized or not. Assuming that the solenoid is turned on, the program moves to the step S2 so as to determine if the time, as represented in FIG. 4, has elapsed. If it has, the program moves to the step S3 to turn the solenoid off. If it has not, the program returns.

If, at the step S1 it is determined that the solenoid is not turned on, the program moves to the step S4. At this step, the off time is calculated. This off time, as seen in FIG. 5 is equal to the total consumption time minus the on time. The solenoid on time in order to achieve a single cycle of pumping is approximately forty milliseconds (40 ms).

Having calculated the off time, the program then moves to the step S5 to determine if the off time has elapsed. If it has not, the program repeats.

If, however, at the step S5 it is determined that the off time has elapsed, the program moves to the step S6 to clear the on/off control timer and then to step S7 so as to turn the solenoid on so as to initiate the next pumping cycle as seen at the extreme right-hand side of FIG. 5.

The construction and operation of the device as thus far described, may be considered to be conventional. That is, the invention, which will now be described in most detail, can be utilized with the aforedescribed construction or with any other type of pumping arrangements and lubricating system.

In accordance with the invention, an arrangement is incorporated for detecting when the oil pump 33 malfunctions and is not operative. Thereafter either a protective and/or warning action is initiated.

FIG. 2 shows a first embodiment of sensing device for achieving this purpose. In this embodiment, the sensing device is mounted on the end closure 59 of the housing 39 and includes a mounting circuit board 72 that carries on it a temperature detection sensor 73 and a sensor, indicated generally by the reference numeral 74 for determining when there is a magnetic field generated as a result of the energization of the coil 53.

This information is collected and then sent to the CPU 34 through a conductor 75. This assembly is the same as the operational detector 68 illustrated in FIG. 1, but is shown in actual detail. Hence, the sensor 74 will provide a signal indicative of the time when a current is actually flowing through the winding 53 and, accordingly, the pump plunger 45 is being driven. This signal is then compared by a comparator with the actual driving signal from the CPU 34 which is sent by the output circuit 63 and, if there is a dissimilarity, to be determined in a manner to be described later, then either a warning and/or protective action may be initiated.

The warning may be of any type, such as a visual alarm, an audible alarm or the like. The protective action may be a slowing of the speed of the engine to a speed when the engine will be protected. In either event, the operator should immediately investigate the problem and resolve it.

FIG. 3 shows another sensing embodiment and in this embodiment the actual movement of the armature 49 and, accordingly, the pumping plunger 45 is measured. This embodiment also includes the mounting plate 72, temperature detector 73 and connector 75. It further includes a proximity sensor 101 which senses when the armature 49 is in proximity to it and, hence, by measuring when the signal disappears and returns, it is possible to measure the actual movement of the pump plunger 45 through its pumping cycle, the distance shown as "D".

As a result of this necessity, the unit has a slightly higher height indicated by the dimension "h" than the previously described embodiment. However, this embodiment will sense other failures that are not measured by the previously described embodiment.

Figure 7:
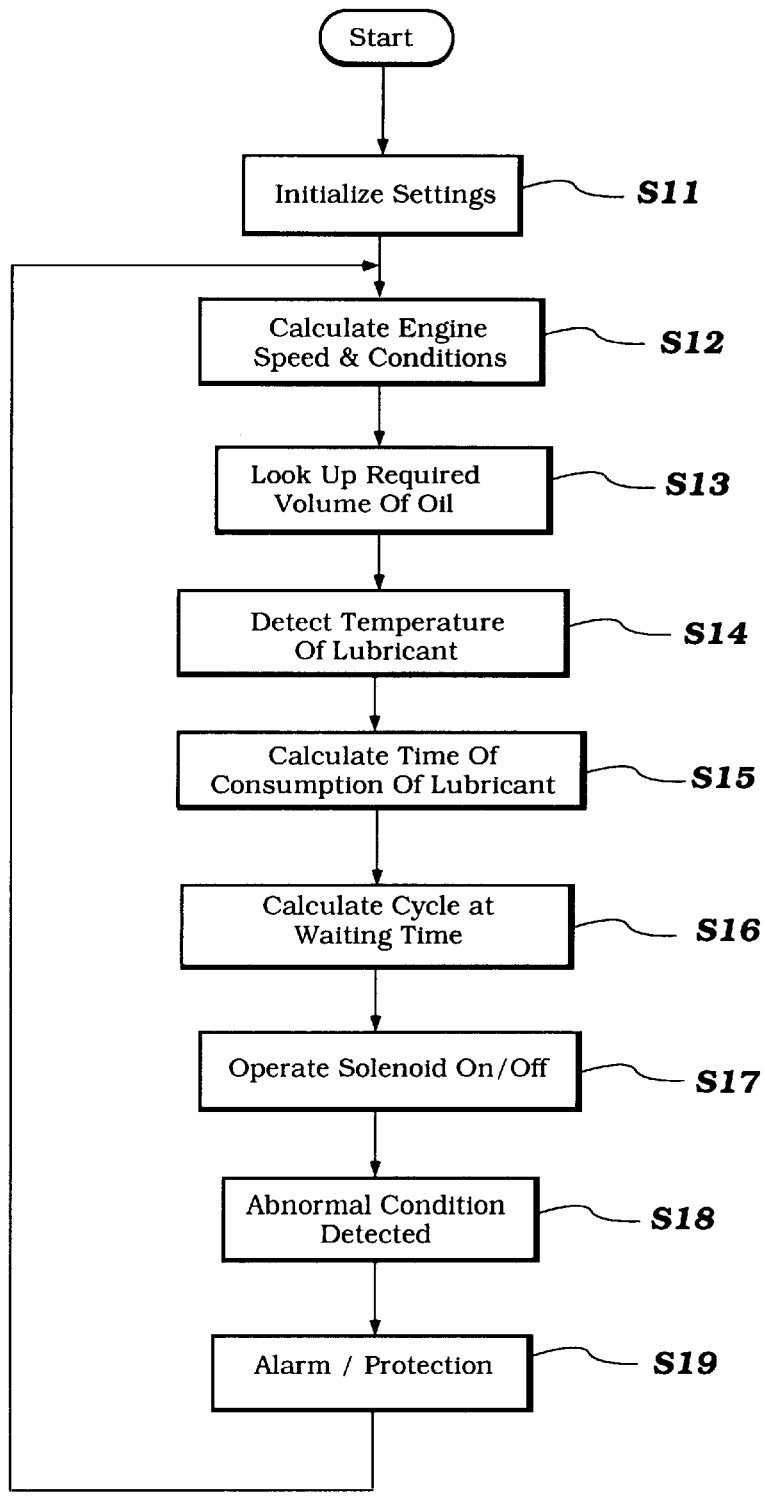
FIG. 7 is a block diagram showing the total control routine in accordance with the invention.

How this abnormal condition sensing fits into the overall operational scheme may be best understood by reference to first the block diagram of FIG. 7, which illustrated the entire control routine.

Referring specifically to FIG. 7, the program starts and then moves to the step S11 to initialize the system. The program then moves to the step S12 so as to read the speed of the engine from the output of the CDI unit 28 and performed by the engine speed section 66 of the controller.

Other conditions may also be measured to determine the oil supply volume, this being performed at the step S13. This is basically done by looking up on a map or memory the appropriate amount of oil for the condition or conditions.

The program then moves to the step S14 so as to determine the temperature of the lubricating oil so as to calculate any correction which may be required due to the change in oil temperature.

The program then moves to the step S15 so as to calculate, in the manner previously described, the total consumption time it will take for the single pumping output of the pump plunger to be consumed by the engine for its running condition.

The program then moves to the step S16 so as to calculate the total time period between the first turning on of the solenoid and the next time that the solenoid winding 53 will be energized.

The program then moves to the step S17 so as to perform the solenoid on-off control for a single cycle of operation.

At the step S18, the actual operation of the pump is compared with the desired operation. This is done by either comparing the length of the output signal with the time at which the winding current is detected, or the time during which the plunger is away from its home position. This will be described later in more detail by reference to the remaining figures. If at the step S18, it is determined that the pump is defective, then the program at the step S19 provides the warning and/or protective action.

Figure 8:
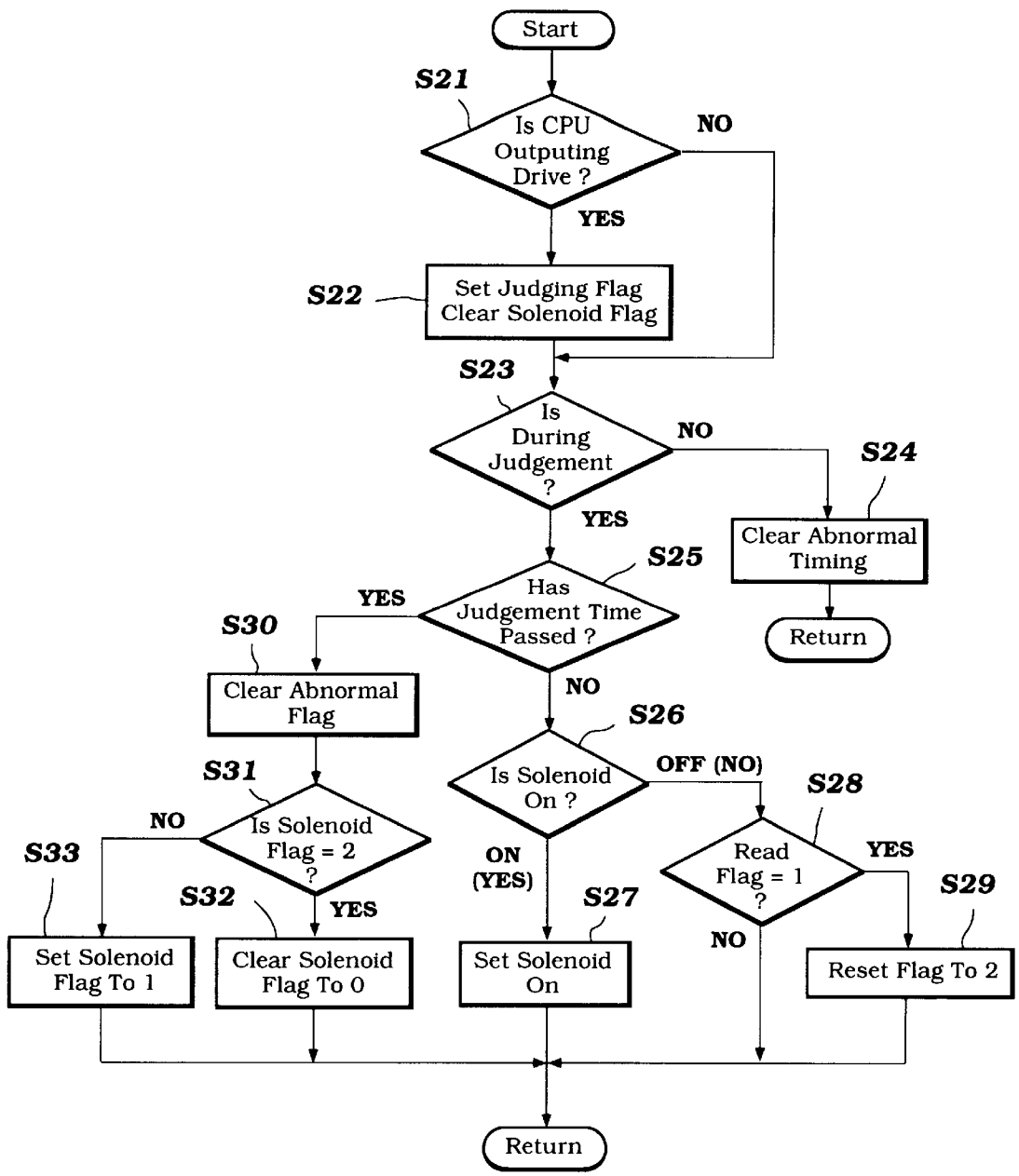
FIG. 8 is a block diagram of another portion of the control routine showing how the abnormal condition is sensed utilizing the pump and sensor construction shown in FIG. 2.

The control routine for determining the abnormal condition is illustrated in FIG. 8, this being the control routine that is utilized with the embodiment of FIG. 2 wherein the timing of existence of current flow in the winding 53 is compared with the timing of the output circuit 63. The program begins at the start and moves to the step S21 to determine if the CPU output circuit 63 is giving an output.

If the CPU output circuit 63 is energized, the program moves to the step S22 so as to set a first flag (abnormal judgment flag) indicating that the abnormal judgment period is being experienced. This time period is determined in a manner which will be described in more detail later by reference to FIG. 10. Also, the flag that judges the solenoid state is then cleared to a value 0.

If the answer at the step S21 is "no" or after the step S22 has been performed, the program moves to the step S23. At this step, the CPU determines if there is a judgment period being made to judge the condition of the solenoid. This is determined by checking the status of the judgment flag. If, at the step S23, it is determined that it is not during a judgment period, the program moves to the step S24 to clear the abnormal judgment timer and returns.

If, however, a judgment period is being performed and the answer is "yes" at the step S23, the program moves to the step S25 to determine if the judgment period is still open, i.e., the judgment timer has not run out. If the judgment period has not passed, then the program moves onto the step S26 to determine if the solenoid winding 53 is still energized.

If the solenoid is determined to be on at the step S26, the program moves to the step S27 so as to set the solenoid state flag at the value 1 to indicate that the solenoid is on. The program then returns.

If, however, at the step S26 it is determined that the solenoid is turned off, the program moves to the step S28 so as to read the setting of the solenoid condition flag. If the condition of the flag is equal to 1, then the program moves to the step S29 so as to reset the flag to the condition 2 indicating that it is off. The program then returns.

If, however, a the step S28 it is determined that the condition flag of the solenoid is not set at 1, the program returns.

Going back now to the step S25, if at this step it has been determined that the judgment period has passed, then the program moves to the step S30 so as to clear the abnormal judgment flag that indicates whether or not the abnormal judgment period time is running. The program then moves to the step S31 so as to determine the condition of the solenoid condition flag. If the flag value at the step S31 is 2, the program moves to the step S32 to clear the flag and set it to zero. The program then returns.

If, however, the plunger flag is not at 2, then it is determined that there is an abnormal state and the flag value is set to 1 and the program returns.

Figure 9:
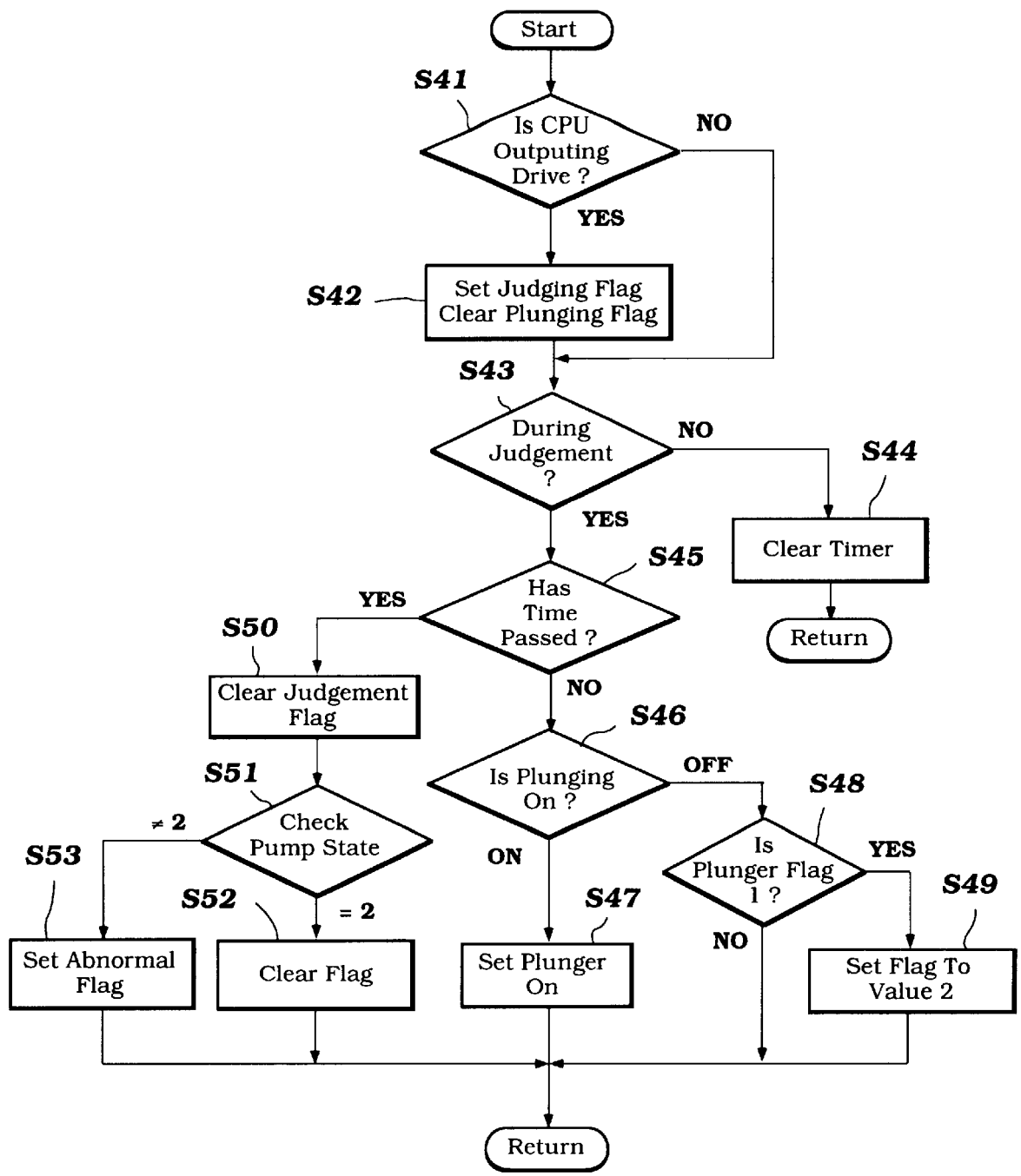
FIG. 9 is a block diagram, in part similar to FIG. 8 and shows another control routine embodiment utilizing the pump and sensor construction shown in FIG. 3.

FIG. 9 is a control routine map similar to that of FIG. 8, but shows that associated with the embodiment of FIG. 3. In this embodiment, the testing is done, not as to whether or not the solenoid winding 53 is energized, but rather the position of the pump plunger 45 sensed through the position of the armature 49.

Referring to this figure, it will be seen that the program starts and again moves to a step S41 so as to determine if the CPU is outputting a drive signal to the solenoid winding. If it is not, the program skips ahead.

If, however, the CPU is outputting a drive signal, the program moves to the step S42 wherein the judgment flag is set to indicate that the abnormal judgment condition is being monitored and the plunger position flag is reset to zero.

Then, the program moves to the step S43 to confirm that the judgment period is still being encountered. If it is not, the program moves to the step S44 so as to clear the abnormal judgment timer and then return.

If, however, at the step S44 the judgment period is still being encountered, the program moves to the step S45 to see if the abnormal judgment period time has passed. If it has not, the program moves to the step S46 to determine if the plunger is still in its driven or pumping position. If it is, the program moves to the step S47 to reset the plunger condition flag to the value 1, and the program then repeats.

If, however, the pumping plunger is determined to be in the "off" condition at the step S46, the program moves to the step S48 to determine the plunger state and to see whether the flag is set in the condition 1, or not. If it is, the program moves to the step S49 to reset the plunger flag to the value 2. The program then repeats.

If, however, returning to the step S45, the abnormal judgment time period has passed, then the program moves to the step S50 to clear the flag indicating the abnormal judgment period and the program then moves to the step S51 to determine the state of the pumping plunger. If the value of the flag is at 2, the program moves to the step S52 and returns. If, however, the value of the pumping plunger flag is not determined to be 2 at the step S51, the program moves to the step S53 to set the flag value to 1 to indicate an abnormal state, and the program repeats.

Figure 10:
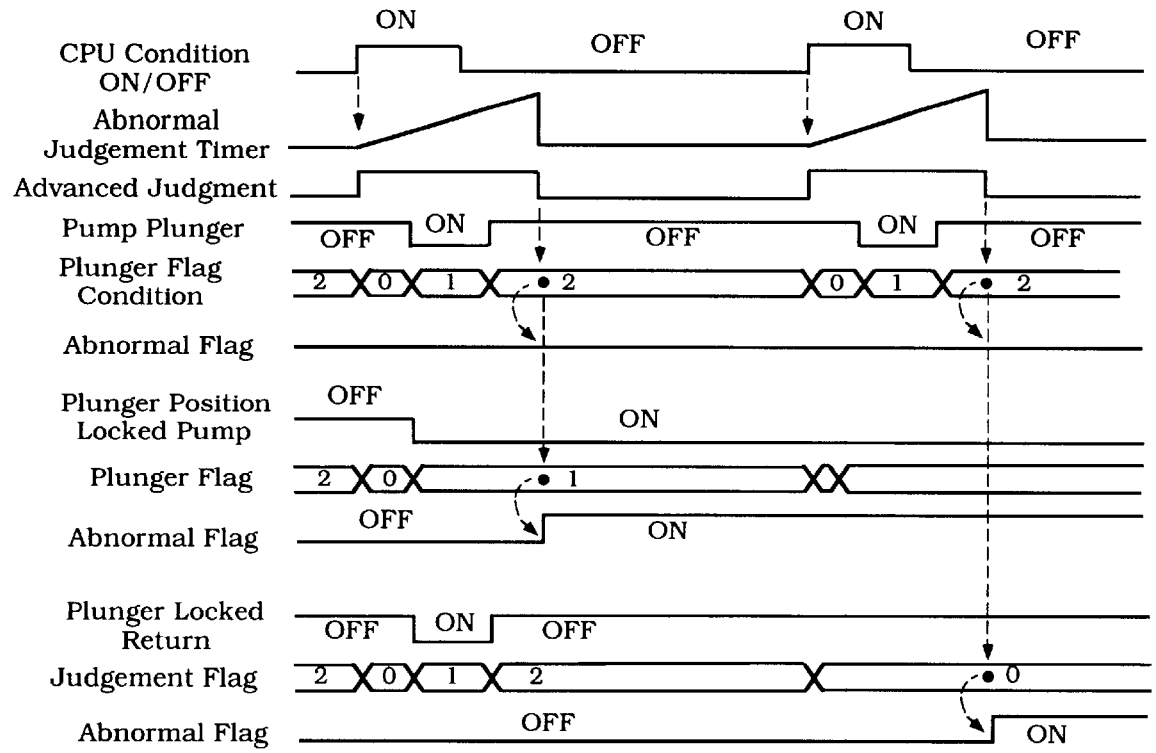
FIG. 10 is a graphical view showing the condition of the pump output and various conditions in the circuit in connection with the control routine of FIG. 9.

The flow diagrams described can be best understood by reference to FIG. 10 which shows the conditions of the various flags and timers during cycles that are normal, as at the top, and abnormal, as at the bottom. The figure illustrates a condition utilized in the pump plunger position sensor of FIG. 3 and the control routine of FIG. 9. However, a similar diagram would result utilizing the sensor arrangement of FIG. 2 in the control routine of FIG. 8.

As may be seen looking across the upper-most curve, this shows the condition during successive cycles when lubricant is being called for and the CPU driver circuit goes from an "on" state during the pumping cycle to an "off" state. The abnormal judgment timer begins to run when the CPU turns on and turns off at a time after the CPU output turns off. The reason for this may be understood by a comparison of the top curve showing the CPU output condition and the fourth curve which shows the pump plunger condition under normal operations.

As may be seen, once the CPU output is initiated, the pump plunger does not begin to move immediately because there is a lag or response delay in the system. In a like manner, when the CPU is turned off, there is a delay while the pump plunger goes through its return stroke. Thus, the abnormal judgment timer is set for a time period long enough after the beginning of the "on" cycle from the CPU until it will be assured that the pump plunger has returned to its normal position after shutoff.

If the sensed condition was solenoid winding current, these time periods would be slightly, but the same principle would apply.

Thus, referring to the condition of the pump plunger flag, at the completion of the previous normal cycle, the plunger flag will have been set to the value 2 at either the steps S49 or S52. However, once the abnormal judgment timer begins to run, the judgment flag will be set and, at the same time, the plunger flag will be reset to zero.

Continuing on, once the pump plunger moves to its pumping condition, then the control routine of FIG. 9 will have a resetting of the pump plunger condition to the value 1. This occurs basically at the step S47 of FIG. 9.

However, once the solenoid winding current is discontinued and the pump plunger returns to its home position, the flag will not be reset to the value 2 until after the timer period has run and the abnormal judgment period flag has been reset as indicated by the point 2 on the chart of FIG. 10. As the normal cycles repeat, the same routine will follow and the abnormal condition flag will not be set.

Continuing to move downwardly on FIG. 10, the next series of views show the condition when the pump plunger is locked in its pumping stroke somewhere away from its return position. When this occurs, then the pump plunger flag will remain in the 1 condition. Thus, when the abnormal judgment timer runs out and the program moves to the steps S50 an S51, it will be determined that the plunger state has not changed to the value 2 and, hence, the abnormal flag will be set at the step S53.

Assuming this condition maintains, when the timer cycle again starts, the plunger flag will be quickly cleared at the step S42, but again will be set to the value 1 when passing through the steps S45, S46 and S47.

Finally, the lower three curves show the condition where the pump plunger is locked in its home or return condition. Thus, the first cycle will operate normally and the values will persist until the second cycle of operation occurs, during which time the pump plunger becomes locked in its position. Thus, when the next judgment period begins and ends, the plunger condition flag will have been locked in its cleared 0 value condition and, thus, at the step S51, it will determine that the flag value is not equal to 2 and the abnormal flag will again be set.

Figure 11:
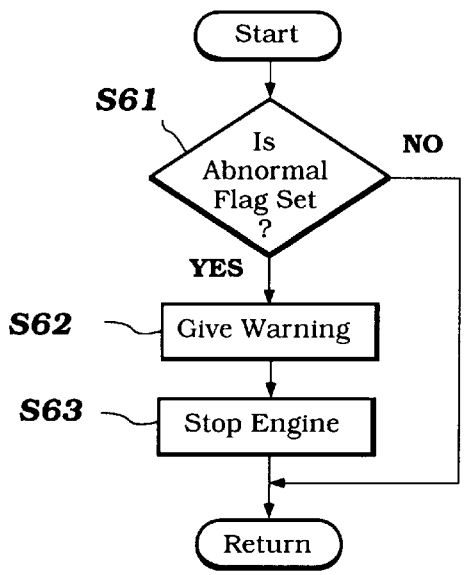
FIG. 11 is a block diagram showing the control for ensuring engine protection in the event of abnormal pump operation.

Finally, FIG. 11 shows the routine for initiating the protective action. The program begins and moves to the step S61 to determine if there is abnormal operation by checking the condition of the abnormal condition flag to determine if its value is set at 1. If it is not, the program merely returns.

If, however, the abnormal flag is determined to be set at the step S61, the program moves to step S62 to provide a warning, which in this case comprises a flashing of a warning lamp. The program then moves to the step S63 so as to initiate protective action for the engine, such as either shutting it down or reducing its speed.

Thus, from the foregoing description, it should be readily apparent that the described instructions provide a very effective arrangement for ensuring operativeness of the lubricating pump and providing warning and protection action in the event the pump is not pumping properly.

Of course, the various embodiments shown are those preferred forms which the invention can take, but various changes and modifications may be made without departing from the spirit and scope of the invention as defined by the appended claims.

What is claimed is:

1. A lubricating supply system for an internal combustion engine having a lubricating pump comprised of a solenoid operated reciprocating pumping element, a control system for controlling the reciprocation of said pumping element by activating said solenoid so as to control the amount of lubricant delivered to said engine components by initiating a pumping cycle and a holding, off cycle, means for comparing the initiation and termination of the pumping signals from said control with the condition of said lubricating pump, means for determining the condition of said lubricating pump to determine if coincidence between the pumping signal from said control and the commanded condition of said lubricant pump occurs, and means for providing a warning in the event a coincidence does not occur.

2. A lubricating supply system for an internal combustion engine as set forth in claim 1, wherein in the condition of the lubricating pump is determined by sensing the condition of current flow through the solenoid.

3. A lubricating supply system for an internal combustion engine as set forth in claim 1, wherein the condition of the lubricating pump is determined by sensing the position of the pumping element of the pump.

4. A lubricating supply system for an internal combustion engine as set forth in claim 1, wherein the condition of the lubricating pump is determined at a time after the initiation of a pumping cycle and for a predetermined amount time period after the pumping cycle is discontinued.

5. A lubricating supply system for an internal combustion engine as set forth in claim 4, wherein in the condition of the lubricating pump is determined by sensing the condition of current flow through the solenoid.

6. A lubricating supply system for an internal combustion engine as set forth in claim 4, wherein the condition of the lubricating pump is determined by sensing the position of the pumping element of the pump.

7. A lubricant supply system for an internal combustion engine as set forth in claim 1 wherein the coincidence is determined by determining whether the initiation of a pumping signal corresponds with the initiation of an actual pumping cycle by the pumping element and the initiation of the holding, off cycle, and the end of the actual pumping delivery.

8. A lubricating supply system for an internal combustion engine as set forth in claim 7, wherein in the condition of the lubricating pump pumping element is determined by sensing the condition of current flow through the solenoid.

9. A lubricating supply system for an internal combustion engine as set forth in claim 7, wherein the condition of the lubricating pump pumping element is determined by sensing the position of said pumping element.

10. A lubricating supply system for an internal combustion engine as set forth in claim 7, wherein the condition of the lubricating pump pumping element is determined at a time after the initiation of a pumping cycle and for a predetermined amount time period after the pumping cycle is discontinued.

11. A lubricating supply system for an internal combustion engine as set forth in claim 10, wherein in the condition of the lubricating pump pumping element is determined by sensing the condition of current flow through the solenoid.

12. A lubricating supply system for an internal combustion engine as set forth in claim 10, wherein the condition of the lubricating pump pumping element is determined by sensing the position of said pumping element.

* * * * *